3,361,756
2-(α-HALOALKANOYL) BENZIMIDAZOLES
Janos Kollonitsch, Westfield, N.J., assignor to Merck & Co., Inc., Rahway, N.J., a corporation of New Jersey
No Drawing. Original application Nov. 29, 1963, Ser. No. 327,104, now Patent No. 3,320,273, dated May 16, 1967. Divided and this application Oct. 28, 1966, Ser. No. 590,192
5 Claims. (Cl. 260—309.2)

---

ABSTRACT OF THE DISCLOSURE

Novel 2-(α-haloalkanoyl) benzimidazoles are prepared from 2-(1'-hydroxyalkyl) benzimidazoles by oxidation of the latter compounds to novel 2-alkanoyl benzimidazoles, conversion thereof to an enol trifluoroacetate which is then halogenated to a 2-(1',2'-dihalo-1'-trifluoroacetoxyalkyl)-1-trifluoroacetyl benzimidazole. These substances are treated with alcohol to afford 2-(α-haloalkanoyl) benzimidazoles.

---

This application is a division of my copending application Ser. No. 327,104, filed Nov. 29, 1963, now U.S. Patent 3,320,273.

This invention relates to novel 2-(α-haloalkanoyl)-benzimidazoles. More specifically it relates to the preparation of 2-(α-haloalkanoyl)benzimidazoles which may be converted into 2-(4'-thiazolyl)benzimidazoles. Specifically, it relates to 2-(bromoactyl)benzimidazoles, novel processes for obtaining them, novel intermediates obtained thereby.

It has recently been discovered that certain benzimidazoles substituted in the 2-position with a 4'-thiazoyl radical possess anthelmintic activity. This discovery has prompted an increasing amount of research into various methods and processes by which these benezimidazoles may be produced.

It is accordingly an object of this invention to provide novel 2-(α-haloalkanoyl)benzimidazoles, and processes for obtaining them, which benzimidazoles may be converted into 2-(4'-thiazolyl)benzimidazoles.

Another object of this invention is to provide novel 2-(1'-2'-dihalo-1'-trifluoroacetoxy alkyl) - 1-trifluoroacetyl benzimidazole trifluoroacetates and a process for obtaining them.

A further object of the invention is to provide novel 2-(1'-trifluoroacetoxy alkenyl) - 1 - trifluoroacetyl benzimidazole trifluoroacetates and a process for obtaining them.

Still a further object of the invention is to provide novel 2-alkanoyl benzimidazoles.

These and further objects will become more apparent when consideration is given to the following detailed disclosure.

The novel end compounds which the present invention yields and which may be converted into 2-(4'-thiazolyl)-benzimidazoles are the 2-(α-haloalkanoyl)benzimidazoles depicted structurally as follows:

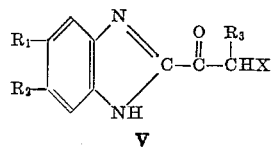

V where an X is a chlorine or a bromine atom and $R_1$ and $R_2$ are hydrogen, lower alkyl, such as methyl, ethyl, propyl, and butyl, lower alkoxy such as methoxy, ethoxy, propoxy, and butoxy, or trifluoromethyl groups, and $R_3$ is hydrogen or a lower alkyl group such as methyl, propyl, butyl, and the like. Representative of such compounds are 2-(α-bromoacetyl)benzimidazole, 2-(α-chloroacetyl)benzimidazole, 2 - (α-bromopropionyl)-5-methyl benzimidazole, 2-(α-chloroacetyl)-5,6-dimethyl benzimidazole, 2-(α-chloroacetyl)-5-methyl-6-trifluoromethyl benzimidazoles, and the like. The preferred compounds are 2-(α-bromoacetyl)benzimidazole and 2-(α-chloroacetyl)-benzimidazole. Also within the scope of the present invention are novel intermediates obtained as a result of preparing compounds V.

In general, compounds V are prepared from 2-(1'-hydroxyalkyl)benzimidazoles by a series of reactive steps which convert the hydroxyalkyl substituent to the desired halogenated side chain. It has been discovered that the compounds of Formula V are not obtained when conventional halogenation techniques are employed. The invention, therefore, involves the use of specific reagent materials and process conditions as will be recited hereinafter.

In accordance with the invention, 2-(1'-hydroxyalkyl)-benzimidazoles are first oxidized so as to convert the hydroxy group of the hydroxyalkyl moiety to the corresponding keto group, thus yielding an α-alkanoyl benzimidazole. This compound is then converted into the enol trifluoroacetate by reaction with trifluoroacetic acid anhydride using catalytic amounts of a strong sulfonic acid to yield a 2-(1'-trifluoroacetoxy alkenyl)-1-trifluoroacetyl benzimidazole in the form of its trifluoroacetic acid addition salt which is then halogenated to obtain a 2-(1'-2'-dihalo-1'-trifluoroacetoxy alkyl)-1-trifluoroacetyl benzimidazole trifluoroacetate. These latter compounds are subsequently treated to remove specifically the 1'-halo atom and the 1'-trifluoroacetoxy group so as to obtain the monohalo compound of Formula V. The following flow diagram structurally depicts the presently described overall process:

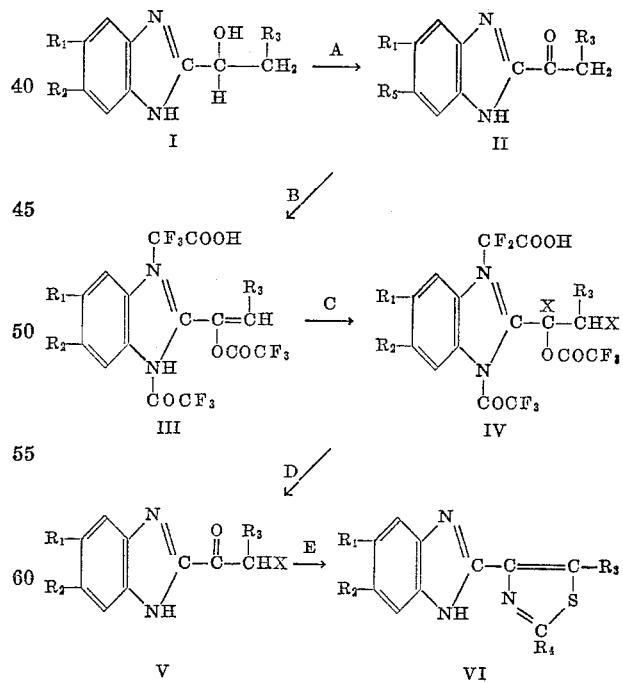

wherein $R_1$, $R_2$, $R_3$, and X are as previously assigned and $R_4$ is a hydrogen or a lowed alkyl radical such as methyl, ethyl, propyl, and the like. Compounds II, III, IV, and V are novel.

According to the first step of the process, compounds II are obtained by oxidizing a 2 - (1' - hydroxyalkyl) - benzimidazole with a suitable oxidizing system so as to convert the hydroxymethyl group to the keto group. Oxidizing agents as are normally suitable for the conversion of such a group may be employed; suitable systems are permanganate, dichromate, or an Oppenauer system comprising an aluminum alkoxide such as aluminum isopropoxide in combination with a ketone such as acetone, cyclohexanone, and the like. The preferred oxidizing system is an alkali metal dichromate system, most preferably sodium dichromate, in the presence of hydronium ions. As sources of hydronium ion, there may be mentioned sulfuric acid, phosphoric acid, acetic acid, and the like, with sulfuric being preferred. It is, of course, preferred to supply at least an amount of acid sufficient to provide the proper number of hydronium ions as required by the stoichiometry of the reaction. Likewise, it is preferred for reasons of economy to supply at least the stoichiometric amount of the oxidizing agent so as to convert as much of the starting material as possible. It is most preferred to employ excesses of the acid so as to provide a vehicle for the reaction, such excesses acting as a solvent for the system. Amounts of acid ranging from 100–500% in excess of that required by stoichiometry are suitable. The temperature of the reaction is not critical, but due to the exothermic nature of the reaction, temperatures lower than room temperature are desirable. Suitable results are obtained at a temperature within the range of from 0–10° C. As a result of this step, the keto compound is obtained as the free base when the oxidizing system uses no acid or in solution as the acid addition salt when an acid has been used, and may be extracted from the solution either as the salt or as the free base, using suitable organic solvents, by techniques known in the art. Such solvents as lower alkanols, for example methanol and ethanol and ethers such as tetrahydrofuran, are suitable for this purpose. It is preferred to obtain the product as the acid addition salt, but where the free base is desired, such may be obtained by neutralizing the reaction mass with a suitable base as for example, sodium hydroxide, potassium hydroxide, ammonium hydroxide, and the like. Both the free base compounds and addition salts so obtained are novel. Representative of these are 2-acetyl benzimidazole, 2-propionyl benzimidazole, 2-acetyl - 5 - methyl benzimidazole, 2 - butryl - 5,6 - dimethyl benzimidazole, 2 - acetyl - 6 - trifluoromethyl benzimidazole, and the like, and the sulfuric acid, acetic acid, phosphoric acid addition salts thereof.

Step B of the process contemplates the formation of the enol-trifluoroacetate of compounds II. It has been discovered that conventional acylating techniques for the preparation of these compounds are not suitable. The use of acetic acid anhydride for example, does not result in the formation of the enol-acetate. In accordance with this step of the invention, the enols are selectively formed by reaction of compounds II with trifluoroacetic acid anhydride in the presence of a catalytic amount of a strong sulfonic acid such as 3,5-dinitrobenzene sulfonic acid, 2,4-dinitrobenzene sulfonic acid, p-toluene sulfonic acid, benzene sulfonic acid, methane sulfonic acid and the like. With regard to the amounts of reagents, it is preferred to use a slight excess of the trifluoroacetic acid anhydride over that required by keto compounds. The amount of catalyst may suitably be between 0.01 and 0.05 moles per mole of keto compound used. The temperature of the reaction is not critical, room temperature being suitable. Temperatures somewhat lower than room temperature, of the order of 0–15° C., are preferred. It is preferred further to carry out the reaction without the addition of a solvent, the excess anhydride acting as such, although other solvents may be used as desired. As a result of this step, the acetic addition salt of 2-(1'-trifluoroacetoxy alkenyl)-1-trifluoroacetyl benzimidazole, compounds III are obtained. It is preferred to use them as such in Step C of the process without further treatment. They may, however, be separated from unreacted trifluoroacetic acid anhydride, or the solvent where one was employed by evaporation in vacuo. The 1-trifluoroacetyl group may be removed, and the free base of this compound obtained by hydrolysis and neutralization of compounds III using conventional techniques. Representative of compounds III are 2 - (1' - trifluoroacetoxy vinyl) - 1 - trifluoroacetyl benzimidazole trifluoroacetate, 2 - (1' - trifluoroacetoxy vinyl) - 1 - trifluoroacetyl - 5 - methyl benzimidazole trifluoroacetate, 2 - (1' - trifluoroacetoxy propenyl) - 1 - trifluoroacetyl benzimidazole trifluoroacetate, 2 - (1' - trifluoroacetoxy propenyl) - 1 - trifluoroacetyl-5,6-dimethyl benzimidazole trifluoroacetate, 2-(1'-trifluoroacetoxy butenyl)-1-trifluoroacetyl benzimidazole trifluoroacetate, and the like.

Step C of the process involves the halogenation of compounds III to form 2-(1'-2'-dihalo-1'-trifluoroacetoxy alkyl)-1-trifluoroacetyl benzimidazoles as the trifluoroacetic acid addition salt or in free form, by contacting them with chlorine or bromine in a solvent solution. Whether the product is obtained in free form or not depends upon the vehicle for the halogenation. Since the 3-nitrogen of the 2 - (1'-trifluoroacetoxy alkenyl)-1-trifluoroacetyl benzimidazoles is very weakly basic, the trifluoroacetic acid is very loosely bound thereto and may be removed by treatment with almost any solvent. Non-polar solvents such as carbon tetrachloride are not effective to do this, however, whereas polar solvents generally are. It is not critical that compounds III be halogenated as the acid addition salt. Thus, solvents which remove the trifluoroacetic acid may be employed in the halogenation step. Alternatively, the trifluoroacetic acid may be removed as desired by any other conventional technique. As suitable solvents for the halogenation, there may be employed halogenated aliphatic hydrocarbons such as carbon tetrachloride, chloroform, methylene chloride, ethylene chloride, and in general solvents which, themselves, will not halogenate under the conditions employed. The reaction temperature is not critical and a suitable operating range is within 0–25° C. As a result of this step, halogenation occurs preferentially at the 1- and 2-positions of the alkenyl radical with little or no nuclear halogenation. Enough of the halogenating agent should therefore be used to provide, for reasons of economy, two atoms of the halogen per mole of the alkenyl compound, although more or less may be used as desired. The product is obtained as a crystalline precipitate and is separated according to known techniques. Typical of the compounds (Compounds IV) that may be prepared according to the foregoing step are 2-(1'-2'-dibromo-1'-trifluoroacetoxy ethyl)-1-trifluoroacetyl benzimidazole, 2-(1',2'-dichloro-1'-trifluoroacetoxy ethyl)-1-trifluoroacetyl benzimidazole, 2-(1',2'-dibromo-1'-trifluoroacetoxy propyl)-1-trifluoroacetyl benzimidazole, 2 - (1'-2'-dibromo-1'-trifluoroacetoxy ethyl-1-trifluoroacetyl-5-methyl benzimidazole, 2 - (1'-2'-dichloro-1'-trifluoroacetoxy propyl)-1-trifluoroacetyl-5,6-dimethyl benzimidazole, 2-(1'-2'-dibromo-1' - trifluoroacetoxy ethyl) - 1 - trifluoroacetyl-5-trifluoromethyl benzimidazole and the like, and the trifluoroacetic acid addition salts thereof.

Compounds IV are converted to the corresponding 2-(α-haloalkanoyl)benzimidazole by reacting them with lower alkanols such as methanol, ethanol, propanol, isopropanol, butanol and the like. The temperature of the reaction is critical and must be below about 50° C. Room temperature is suitable, but it is preferred to use temperatures somewhat lower, of the order of 15–20° C. This step of the process is effective to dehalogenate compounds IV at the 1'-position of the alkyl side chain with the simultaneous removal at the same position of the trifluoroacetoxy group and the trifluoroacetyl group at the 1-N position of the benzimidazole without affecting the halogen atom at the 2-position of the alkyl chain. There are thus obtained compounds V in solution which may be separated therefrom by evaporating the reaction mass to dryness and filtering, washing, and drying the product by known techniques.

Alternatively, the brominated trifluoroacetic acid addition salt form of compounds V may be prepared directly from compounds II by treating a suspension of the keto benzimidazole in trifluoroacetic acid with liquid bromine. The trifluoroacetic acid is used as a solvent and vehicle for the reaction and forms the acid addition salt of compounds V in the reaction mass. The temperature of reaction is not critical, room temperature being suitable. However, the reaction is very slow and generally involves reaction times of several hours. Even using the selective system herein described, wherein nuclear halogenation is avoided, a mixture of halogenated products is obtained. Specifically, the methyl group of the acyl moiety is mono-, di- and tribrominated to yield varying amounts of the corresponding bromo product. The tribromo compound can be separated from the mixture by adsorption chromatography an acid washed alumina, if desired, although it is preferred to use it in the next step without purification. The monobromo compound may be identified in the reaction mixture by treating a sample of the reaction mass with pyridine to form the corresponding pyridinium salt. The formation of the pyridinium salt of the monobromo compound is selective, the dibromo and tribromo compounds being unreactive.

The conversion of compounds V into the 2-(4'-thiazolyl)benzimidazoles is not the subject of the present invention but is an invention of an associate. This conversion of compounds V either in the form of the acid addition salt or not, as desired, is effected by treating them with a thioamide. The term "thioamide" includes compounds of the formula

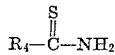

where $R_4$ is hydrogen or lower alkyl. When $R_4$ is lower alkyl as, for example, in thioacetamide and thiopropionamide and the like, the resulting 4'-thiazolyl benzimidazoles are additionally substituted at the 2'-position of the thiazolyl radical with methyl, ethyl, and the like. The preferred reaction is with thioformamide where $R_4$ is hydrogen. Also, there may be employed reagents which form in situ a thioamide. The reaction is suitably carried out in an inert solvent. Such solvents as dioxane, tetrahydrofuran, glycol dimethyl ether, diethylene glycol dimethyl ether, dimethyl sulfoxide are suitable as the reaction vehicle. Temperature of reaction is not critical and suitable results are obtained at temperatures ranging from 50° C to about 150° C. with the preferred temperature conditions being at the reflux temperature of the particular solvent system employed.

The 2-hydroxyethyl benzimidazole starting material is prepared according to the process of Georgescu, Chemsche Berichte, 25, p. 957. The higher alkyl homologs are prepared by using α-hydroxy carboxylic acids which are homologs of the lactic acid starting material of Georgescu in the same process.

The following examples are given for purposes of illustration only and are not to be considered as limiting the scope of the invention.

EXAMPLE 1

*2-acetylbenzimidazole*

19.8 g. of sodium dichromate are dissolved in 75 ml. of water and 45 g. of concentrated sulfuric acid added thereto. This mixture is dropped during 30 minutes into a solution of 8.1 g. 2-(1'-hydroxyethyl)benzimidazole in 100 ml. of 5% sulfuric acid, while stirring. The temperature is maintained between 5–10° C. After stirring it overnight at room temperature, 95 ml. of concentrated ammonia are added at 20–25° C. forming a brown precipitate. The precipitate is separated, filtered, washed with ample amounts of water (4 × 100 ml.), then extracted with 96% ethanol (4×100 ml.). The ethanol extracts are evaporated to dryness giving about 5.7 g. of nearly colorless crystals of the product 2-acetylbenzimidazole. Recrystallization from 5 volumes of ethanol yields the pure ketone (4 g.), M.P. 186–187°.

*Analysis.*—$C_9H_8N_2O$. Calc.: C, 67.4%; H, 5.0%; N, 17.5%. Found: C. 67.12%; H, 4.86%; N, 17.80%.

When the above procedure is repeated using equivalent amounts 2-(1'-hydroxyethyl)-5-methyl benzimidazole, 2-(1'-hydroxyethyl)-5-trifluoromethyl benzimidazole, 2-(1'-hydroxyethyl)-5,6-dimethyl benzimidazole, 2-(1'-hydroxybutyl)benzimidazole, or 2 - (1' - hydroxypentyl) benzimidazole in place of 2-(1' - hydroxyethyl)benzimidazole, the corresponding keto compound is obtained.

When the above procedure is repeted using equivalent amounts of potassium permanganate in place of sodium dichromate, similar results are obtained.

EXAMPLE 2

*2-(1'-trifluoroacetoxy vinyl)-1-trifluoroacetyl benzimidazole trifluoroacetate*

6.40 g. of the 2-acetylbenzimidazole obtained from Example 1 (0.04 mol.) are stirred by a magnetic stirrer with 20 ml. of trifluoroacetic anhydride and 0.15 g. of 3,5-dinitrobenzene sulfonic acid, in a stoppered flask. After 24 hours of stirring, 10 ml. of trifluoroacetic anhydride are added and the resulting mass stirred for 5 more days. The reaction mass becomes very thick during this time. It is thereafter evaporated to dryness in vacuum of 1–2 m./m. at 25° C. yielding 19.47 g. of practically colorless fine powder of the product.

When the foregoing procedure is repeated using equivalent amounts of 2-propionyl-5-methyl benzimidazole or 2-butyryl benzimidazole in place of 2-acetylbenzimidazole the corresponding propenyl of butenyl compound is obtained.

When 3,5-dinitrobenzene sulfonic acid in the foregoing procedure is replaced with equivalent amounts of 2,4-dinitrobenzene sulfonic acid, p-toluene sulfonic acid, benzene sulfonic acid, or methane sulfonic acid, similar results are obtained.

EXAMPLE 3

*2-(1'-2'-dibromo-1'-trifluoroacetoxy ethyl)-1-trifluoroacetyl benzimidazole trifluoroacetate*

4.85 g. of the above obtained enol-trifluoroacetate obtained from Example 2 (corresponding to 0.01 g. mol. of methyl (2-benzimidazoleyl)-ketone) are suspended in 30 ml. of carbon tetrachloride, and a solution of 0.52 ml. of bromine in 5 ml. of carbon tetrachloride added thereto during 1 hour while stirring. During this time, the flask is irradiated by a quartz U.V. lamp. The temperature is maintained at 5° C. for 20 minutes and then allowed to rise to room temperature. After another 1½ hour period at room temperature the color of the bromine is practically gone and a yellow crystalline product separates. This reaction mass is subsequently used in Example 4 below. The solid product may, however, be separated by known techniques if desired.

In a similar manner, the 1'-2'-dichloro compound is obtained by bubbling chlorine gas through the suspension of the enol-trifluoroacetate in carbon tetrachloride at a temperature of about 5° C. for a period of 20 minutes with room temperature aging of ½ hour.

When the foregoing procedure is repeated using equivalent amounts of 2-(1'-trifluoroacetoxy vinyl)-1-trifluoroacetyl-5-methyl benzimidazole trifluoroacetate, 2-(1'-trifluoroacetoxy propenyl) - 1 - trifluoroacetyl-5-trifluoromethyl benzimidazole trifluoroacetate, or 2-(1'-trifluoroacetoxy pentenyl)-1-trifluoroacetyl benzimidazole trifluoroacetate in place of 2-(1'-trifluoroacetoxy vinyl)-1-trifluoroacetyl benzimidazole, the corresponding dihalo compound is obtained.

EXAMPLE 4

2-(α-bromoacetyl)benzimidazole

Thirty ml. of methanol are added to the reaction mass containing 2-(1'-2'-dibromo-1'-trifluoroacetoxy ethyl)-1-trifluoroacetyl benzimidazole trifluoroacetate as obtained in Example 3, and the resulting solution kept at room temperature for about 20 hours. The mixture is then evaporated to dryness, and the crystalline residue stirred with a solution of 2 g. sodium hydrocarbonate in 25 ml. water for 15 minutes. It is then filtered, washed with water and dried yielding 1.5 g. of crude 2-(α-bromoacetyl)benzimidazole. Assay by the pyridinium salt method wherein the residue is reacted with pyridine in an acetone solution at room temperature indicates a purity of about 50%. It is used in Example 6 without further purification.

When the foregoing procedure is repeated using equivalent amounts of 2-(1'-2'-dichloro-1'-trifluoroacetoxy ethyl)-1-trifluoroacetyl benzimidazole trifluoroacetate, 2-(1'-2'-dibromo-1'-trifluoroacetoxy propyl)-1-trifluoroacetyl benzimidazole trifluoroacetate, 2-(1'-2'-dibromo-1'-trifluoroacetoxy propyl)-1-trifluoroacetyl-5-methyl benzimidazole trifluoroacetate, or 2-(1'-2'-dichloro-1'-trifluoroacetoxy ethyl)-1-trifluoroacetyl-5-trifluoromethyl benzimidazole trifluoroacetate in place of 2-(1'-2'-dichloro-1'-trifluoroacetoxy ethyl)-1-trifluoroacetyl benzimidazole trifluoroacetate, the corresponding monohalo compound is obtained.

EXAMPLE 5

2-(α-bromoacetyl)benzimidazole 6.40 g. of 2-acetylbenzimidazole (0.04 mol) are suspended in 40 ml. of trifluoroacetic acid and 2.08 ml. (0.082 atom) of bromine added thereto. The mixture is stirred at room temperature in a glass-stoppered flask for 3 days. A brick-red colored suspension is formed first, slowly transforming into a snow-white fine suspension. The solvent is distilled off in vacuo at room temperature yielding 12.4 g. of a white powder which is a mixture of the hydrobromides of four compounds: the starting material and the α-mono-, α,α-di-, and α,α,α-tribromo 2-acetylbenzimidazole. Thereafter 6.2 g. of the brominated mixture are added to a solution of 10 g. of sodium hydrocarbonate in 150 ml. of water, stirred for 30 minutes, filtered, washed with water and dried. There is thus obtained 3.50 g. of light-colored product, comprising the above-mentioned four compounds. 1.20 g. of this base mixture is dissolved in 6 ml. of acetone, and 0.40 ml. of pyridine then added. The mixture is allowed to stand for 20 minutes, during which time the pyridinium salt of the mono-bromketone forms. The mass is filtered, and the precipitate washed with acetone (3× 2 ml.), yielding 0.32 g. of the pyridinium salt of the monobromoketone.

*Analysis.*—$C_{14}H_{12}ON_3Br$. M.W. 318.1. Calc.: C, 52.95%; H, 3.80%; N, 13.2%; Br, 25.1%. Found: C, 51.47%; H, 3.39%; N, 11.12%; Br, 25.73%.

When the above procedure is repeated using equivalent amounts of 2-acetyl-5-methyl benzimidazole, 2-propenyl benzimidazole, 2-acetyl-5,6-dimethyl benzimidazole, or 2-butenyl-5-trifluoromethyl benzimidazole in place of 2-acetylbenzimidazole, the corresponding 2-(α-bromoalkyl) benzimidazole is obtained.

EXAMPLE 6

2-(4'-thiazolyl)benzimidazole 0.72 g. of the crude monobromoketone, obtained in Example 4, are dissolved in 2 ml. of dioxane and mixed with 0.31 g. of thioformamide. The resulting clear solution is then immersed in a bath at 97° for 10 minutes. The dioxane is evaporated in vacuo at room temperature, and the resulting mass flushed with benzene twice. The residue is dissolved in 10 ml. of water, filtered, and extracted with ether (3× 10 ml.). The water layer is then alkalized by addition of solid $NaHCO_3$. A gummy precipitate separates which, on trituration, becomes solid. It is filtered, washed on the filter with water and ether, and the filtrate separated. The water layer is extracted again with ether (3× 10 ml.), and the combined ether extracts dried over magnesium sulfate and evaporated to dryness. The oily product, 2-(4'-thiazolyl)benzimidazole, on trituration with ether (50 ml.) crystallizes.

When the foregoing procedure is repeated replacing the thioformamide with equivalent amounts of thioacetamide or thiopropionamide, 2-(4'-thiazolyl-5'-methyl) benzimidazole or 2-(4'-thiazolyl-5'-ethyl)benzimidazole are obtained.

Any departure from the above description which conforms to the present invention is intended to be included within the scope of the claims.

What is claimed is:

1. A compound of the formula

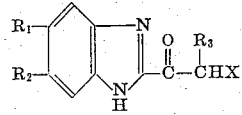

where $R_1$ and $R_2$ are each hydrogen, loweralkyl, loweralkoxy or trifluoromethyl; $R_3$ is hydrogen or loweralkyl; and X is chloro or bromo.

2. The compound of claim 1 where $R_1$, $R_2$ and $R_3$ are hydrogen.

3. The compound of claim 2 where X is chloro.

4. The compound of claim 2 where X is bromo.

5. The method for producing a compound of the formula

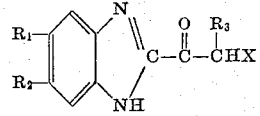

which comprises treating a compound selected from the group consisting of compounds of the formula

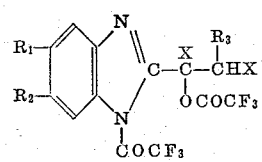

and trifluoroacetic acid addition salts thereof with a lower alkanol at a temperature below 50° C., wherein $R_1$ and $R_2$ are selected from the group consisting of hydrogen, loweralkyl, loweralkoxy, and trifluoromethyl, $R_3$ is selected from the group consisting of hydrogen and loweralkyl, and X is selected from the group consisting of chlorine and bromine.

References Cited

UNITED STATES PATENTS

| | | | |
|---|---|---|---|
| 3,017,415 | 1/1962 | Sarett et al. | 260—302 |
| 3,102,074 | 8/1963 | Brown | 167—55 |
| 2,957,885 | 10/1960 | Boltnick et al. | 260—309.2 |
| 2,980,690 | 4/1961 | Hoffmann et al. | 260—309.2 |
| 3,080,282 | 3/1963 | Shunk | 260—309.2 |

FOREIGN PATENTS 885,520   12/1961   Great Britain.

OTHER REFERENCES

Brown et al., Journal American Chemistry Society, vol. 83, pp. 1764–5 (1961).

JOHN D. RANDOLPH, *Primary Examiner.*

N. TROUSOF, *Assistant Examiner.*